(12) United States Patent
Volkerink et al.

(10) Patent No.: US 12,373,660 B2
(45) Date of Patent: Jul. 29, 2025

(54) CORRELATING ASSET IDENTIFIERS

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 18/378,121

(22) Filed: Oct. 9, 2023

(65) Prior Publication Data

US 2024/0220754 A1 Jul. 4, 2024

Related U.S. Application Data

(63) Continuation of application No. 17/683,738, filed on Mar. 1, 2022, now Pat. No. 11,816,514, which is a continuation of application No. 17/067,608, filed on Oct. 9, 2020, now Pat. No. 11,308,370, which is a continuation-in-part of application No. 16/839,048, (Continued)

(51) Int. Cl.
| | |
|---|---|
| *G06K 15/02* | (2006.01) |
| *G06K 1/12* | (2006.01) |
| *G06K 19/02* | (2006.01) |
| *G06K 19/06* | (2006.01) |
| *G06K 19/07* | (2006.01) |

(52) U.S. Cl.
CPC ........... *G06K 15/021* (2013.01); *G06K 1/121* (2013.01); *G06K 15/1856* (2013.01); *G06K 19/025* (2013.01); *G06K 19/06037* (2013.01); *G06K 19/0723* (2013.01)

(58) Field of Classification Search
CPC .. G06K 15/021; G06K 1/121; G06K 15/1856; G06K 19/025; G06K 19/06037; G06K 19/0723; G06K 17/0025; G06K 19/07718; G06K 19/08; G06F 21/44; G06Q 10/087; G06Q 20/40; G06Q 20/4014; G06Q 20/4015; H04W 4/80; H04W 4/027; H04W 4/029; H04W 4/185; B32B 2457/00; B32B 37/12
See application file for complete search history.

(56) References Cited

U.S. PATENT DOCUMENTS

| | | |
|---|---|---|
| 5,495,250 A | 2/1996 | Ghaem et al. |
| 6,375,780 B1 | 4/2002 | Tuttle et al. |
| (Continued) | | |

FOREIGN PATENT DOCUMENTS

| | | |
|---|---|---|
| AU | 2018204317 A1 | 1/2019 |
| CA | 3008512 A1 | 12/2018 |
| (Continued) | | |

OTHER PUBLICATIONS

Canadian Examination Report mailed Mar. 6, 2024, for CA 3,158,677, 6 pages.

(Continued)

*Primary Examiner* — Seung H Lee

(57) ABSTRACT

Systems, methods, and computer-readable media provide automated identification techniques that associate at least two unique identifiers of one segment of a segmental multimode wireless flexible product to seamlessly and accurately bridge different identification methodologies to enable advanced real-time tracking of shipment location and status, and other such useful and advanced product and service offerings.

20 Claims, 7 Drawing Sheets

Related U.S. Application Data filed on Apr. 2, 2020, now Pat. No. 11,295,190, which is a continuation-in-part of application No. 16/581,599, filed on Sep. 24, 2019, now Pat. No. 11,328,201, which is a continuation-in-part of application No. 16/383,353, filed on Apr. 12, 2019, now Pat. No. 10,872,286.

(60) Provisional application No. 62/912,647, filed on Oct. 9, 2019, provisional application No. 62/829,627, filed on Apr. 4, 2019.

(56) References Cited

U.S. PATENT DOCUMENTS

| | | | |
|---|---|---|---|
| 6,614,392 B2 | 9/2003 | Howard | |
| 6,816,075 B2 | 11/2004 | Grunes et al. | |
| 7,048,194 B2 | 5/2006 | Minami et al. | |
| 7,177,054 B2 | 2/2007 | Silverbrook et al. | |
| 7,299,990 B2 | 11/2007 | Hoshina | |
| 7,360,714 B2 | 4/2008 | Sano et al. | |
| 7,405,656 B2 | 7/2008 | Olsen | |
| 7,511,616 B2 | 3/2009 | Lake | |
| 7,540,603 B2 | 6/2009 | Otsuki | |
| 7,743,984 B2 | 6/2010 | Olsen et al. | |
| 7,838,844 B2 | 11/2010 | Wagner et al. | |
| 7,866,555 B2 | 1/2011 | Schmid et al. | |
| 8,016,194 B2 | 9/2011 | Hause et al. | |
| 8,072,620 B2 | 12/2011 | Yamamoto et al. | |
| 8,171,791 B2 | 5/2012 | Sy et al. | |
| 8,231,749 B2 | 7/2012 | Dent et al. | |
| 8,292,173 B2 | 10/2012 | Yturralde et al. | |
| 8,317,230 B2 | 11/2012 | Asay | |
| 8,581,701 B2 | 11/2013 | Steinmetz et al. | |
| 8,686,685 B2 | 4/2014 | Moshfeghi | |
| 8,833,664 B2 | 9/2014 | Choi | |
| 9,251,459 B2 | 2/2016 | Simske et al. | |
| 9,305,283 B1 | 4/2016 | Lauka et al. | |
| 9,643,460 B2 | 5/2017 | Peine et al. | |
| 9,644,401 B2 | 5/2017 | Nguyen et al. | |
| 10,095,898 B2 | 10/2018 | Iqbal et al. | |
| 10,319,203 B1 * | 6/2019 | Testanero | G08B 13/2434 |
| 10,819,137 B2 | 10/2020 | Khoche et al. | |
| 11,115,732 B2 | 9/2021 | Lucrecio et al. | |
| 11,295,190 B2 | 4/2022 | Volkerink et al. | |
| 2004/0044493 A1 | 3/2004 | Coulthard | |
| 2004/0247016 A1 | 12/2004 | Faries et al. | |
| 2005/0099292 A1 | 5/2005 | Sajkowsky | |
| 2005/0205673 A1 | 9/2005 | Morris et al. | |
| 2006/0065730 A1 | 3/2006 | Quan et al. | |
| 2006/0213964 A1 | 9/2006 | Excoffier et al. | |
| 2007/0008120 A1 | 1/2007 | Smith et al. | |
| 2007/0049291 A1 | 3/2007 | Kim et al. | |
| 2007/0182556 A1 | 8/2007 | Rado | |
| 2007/0207792 A1 | 9/2007 | Loving | |
| 2007/0287473 A1 | 12/2007 | Dupray | |
| 2008/0198002 A1 | 8/2008 | Bartholf et al. | |
| 2008/0198022 A1 | 8/2008 | Battles et al. | |
| 2009/0174600 A1 | 7/2009 | Mazlum et al. | |
| 2009/0192709 A1 | 7/2009 | Yonker et al. | |
| 2010/0089803 A1 | 4/2010 | Marinus et al. | |
| 2010/0201520 A1 | 8/2010 | Stern et al. | |
| 2011/0062237 A1 | 3/2011 | Chaves | |
| 2011/0139871 A1 | 6/2011 | Yturralde et al. | |
| 2011/0173235 A1 | 7/2011 | Aman et al. | |
| 2012/0256728 A1 | 10/2012 | Bajic et al. | |
| 2012/0278676 A1 | 11/2012 | Teraura | |
| 2012/0286939 A1 | 11/2012 | Cote et al. | |
| 2012/0326862 A1 | 12/2012 | Kwak | |
| 2013/0229263 A1 | 9/2013 | Graczyk et al. | |
| 2013/0250357 A1 | 9/2013 | Yu | |
| 2013/0282392 A1 | 10/2013 | Wurm | |
| 2014/0067313 A1 | 3/2014 | Breed | |
| 2014/0159869 A1 | 6/2014 | Zumsteg et al. | |
| 2014/0240088 A1 | 8/2014 | Robinette et al. | |
| 2014/0263634 A1 | 9/2014 | Iqbal et al. | |
| 2015/0097674 A1 | 4/2015 | Mondal et al. | |
| 2015/0156253 A1 | 6/2015 | Skaaksrud et al. | |
| 2015/0349667 A1 | 12/2015 | Andosca et al. | |
| 2015/0349917 A1 | 12/2015 | Skaaksrud | |
| 2015/0379860 A1 | 12/2015 | Vardi | |
| 2016/0011074 A1 | 1/2016 | Mian et al. | |
| 2016/0026213 A1 | 1/2016 | Li et al. | |
| 2016/0117458 A1 | 4/2016 | Hermans et al. | |
| 2016/0205509 A1 | 7/2016 | Hopcraft et al. | |
| 2017/0011606 A1 | 1/2017 | Ceccon et al. | |
| 2017/0019754 A1 | 1/2017 | Wilkinson | |
| 2017/0083857 A1 | 3/2017 | Barton et al. | |
| 2017/0199268 A1 | 7/2017 | Frederick | |
| 2017/0286903 A1 | 10/2017 | Elizondo | |
| 2017/0337405 A1 | 11/2017 | Schütz | |
| 2018/0011074 A1 | 1/2018 | Roman et al. | |
| 2018/0163095 A1 | 6/2018 | Khoche | |
| 2019/0087702 A1 | 3/2019 | Cotoc | |
| 2019/0337342 A1 | 11/2019 | Genheimer et al. | |
| 2019/0362215 A1 | 11/2019 | Khoche | |
| 2019/0370624 A1 | 12/2019 | Khoche | |
| 2019/0373431 A1 | 12/2019 | Gabriele et al. | |
| 2020/0234098 A1 | 7/2020 | Volkerink et al. | |
| 2020/0275369 A1 | 8/2020 | Foster et al. | |
| 2021/0012173 A1 | 1/2021 | Batra | |
| 2021/0027122 A1 | 1/2021 | Volkerink et al. | |
| 2021/0143902 A1 | 5/2021 | Connolly et al. | |
| 2021/0150159 A1 | 5/2021 | Volkerink et al. | |
| 2021/0179352 A1 | 6/2021 | Haid | |
| 2021/0224721 A1 | 7/2021 | Morgenthau | |
| 2022/0277154 A1 | 9/2022 | Joao | |

FOREIGN PATENT DOCUMENTS

| | | |
|---|---|---|
| JP | 2008239282 A | 10/2008 |
| JP | 2011090670 A | 5/2011 |
| JP | 2012141995 A | 7/2012 |
| WO | 2011038018 A1 | 3/2011 |
| WO | 2014145130 A1 | 9/2014 |
| WO | 2021076513 A1 | 4/2021 |

OTHER PUBLICATIONS

Ding, et al., "RFID-based Production Data Analysis in an IoT-enabled Smart Job-shop." IEEE/CAA Journal of Automatics Sinica, vol. 5, No. 1, Jan. 1, 2018.

International Patent Application No. PCT/US20/26475, International Search Report and Written Opinion, dated Jul. 23, 2020, 14 pages.

International Patent Application No. PCT/US2020/061394 International Search Report and Written Opinion dated Feb. 26, 2021, 16 pages.

International Patent Application No. PCT/US2022/038238 International Search Report and Written Opinion dated Feb. 2, 2023, 17 pages.

International Patent Application No. PCT/US2022/043255 International Search Report and Written Opinion dated Jan. 31, 2023, 11 pages.

International Patent Application No. PCT/US2023/016408 International Search Report and Written Opinion dated Aug. 21, 2023, 32 pages.

Ku et al., Joint Power Waveforming and Beamforming for Wireless Power Transfer, IEEE Transactions on Signal Processing, vol. 65, No. 24, Dec. 15, 2017, pp. 6409-6422.

Non Final Office Action for U.S. Appl. No. 16/359,808, mailed Jan. 22, 2020, 7 pages.

Non Final Office Action for U.S. Appl. No. 17/027,096, mailed Jun. 24, 2021, 6 pages.

Non Final Office Action for U.S. Appl. No. 17/683,738, mailed Feb. 16, 2023, 12 pages.

Non Final Office Action for U.S. Appl. No. 17/872,072, mailed Jan. 16, 2024, 28 pages.

Non Final Office Action for U.S. Appl. No. 18/083,550, mailed Jan. 9, 2024, 9 pages.

(56) References Cited

OTHER PUBLICATIONS

Non Final Office Action for U.S. Appl. No. 18/083,550, mailed May 23, 2023, 7 pages.
Non-Final Office Action Issued in U.S. Appl. No. 17/679,992, mailed Feb. 15, 2024, 7 pages.
Non-Final Office Action Issued in U.S. Appl. No. 17/679,992, mailed Jan. 25, 2023, 8 pages.
Roundy et al., Energy Harvester for Rotating Environments Using Offset Pendulum and Nonlinear Dynamics, Smart Materials and Structures, IOP Publishing Ltd, Sep. 9, 2014.
Ruzzeli et al., "On the RFID wake-up impulse for multi-hop sensor networks." ACM Workshop on Convergence of RFID and Wireless Sensor Networks and their Applications (SenseID) at the 5th ACM International Conference (ACM SenSys 2007), Australia, Nov. 2007.
U.S. Appl. No. 16/839,048, Ex Parte Quayle Action dated Jul. 22, 2021, 6 pages.
U.S. Appl. No. 16/839,048, Notice of Allowance dated Nov. 29, 2021, 15 pages.
U.S. Appl. No. 16/839,048, Notice of Allowance dated Oct. 8, 2021, 14 pages.
U.S. Appl. No. 17/067,608, Ex Parte Quayle Action dated Sep. 24, 2021, 7 pages.
U.S. Appl. No. 17/067,608, Notice of Allowance dated Dec. 1, 2021, 9 pages.
Zhai et al. "A practical wireless charging system based on ultra-wideband retro-reflective beamforming," 2010 IEEE Antennas and Propagation Society International Symposium, 2010, pp. 1-4, doi: 10.1109/APS.2010.5561113) Year: 2010.

\* cited by examiner

CORRELATING ASSET IDENTIFIERS

RELATED APPLICATION

This application is a continuation of U.S. nonprovisional patent application Ser. No. 17/683,738, filed on Mar. 1, 2022, which is a continuation of U.S. Nonprovisional patent application Ser. No. 17/067,608, filed Oct. 9, 2020. U.S. Nonprovisional patent application Ser. No. 17/067,608 claims priority to U.S. Patent Application Ser. No. 62/912,647, filed Oct. 9, 2019, which is incorporated herein by reference in its entirety. U.S. Nonprovisional patent application Ser. No. 17/067,608 also claims priority to and is a continuation-in-part of U.S. patent application Ser. No. 16/839,048, filed Apr. 2, 2020, which is a continuation-in-part of U.S. patent application Ser. No. 16/581,599, filed on Sep. 24, 2019, which is a continuation-in-part of U.S. patent application Ser. No. 16/383,353, filed Apr. 12, 2019, which claims priority from U.S. Patent Application Ser. No. 62/829,627, filed Apr. 4, 2019. Each of the aforementioned applications are incorporated by reference in their entireties as if fully set forth.

BACKGROUND

A supplier and a company may manage different aspects of a task, such as shipping and tracking assets and goods to the company's customers. The company may have its own information technology process for identifying the assets (or items) being shipped that is different from the supplier's asset/package tracking identification system. In addition, the company and the supplier may use different asset identification technologies, such as radio frequency identification (RFID) technologies and barcode technologies.

SUMMARY

Identification techniques that bridge the differences between identification systems used by a company and a supplier enable more useful and more advanced product and service offerings to be provided.

In one aspect, the embodiments disclosed herein provide a method of fabricating a segmental wireless flexible product with respective sets of correlated identifiers of component devices. The method comprises loading the segmental wireless flexible product into a printer, where each segment of the segmental wireless flexible product comprises, between a cover and a substrate, a respective wireless communications interface, a respective processor, and a respective first memory storing a respective first globally unique component device identifier of the segmental wireless flexible product. For each segment of the segmental wireless flexible product, a respective RFID inlay comprising a respective second memory is printed over the cover of the segmental wireless flexible tape product. For each segment of the segmental wireless flexible product, the respective second globally unique component device identifier is wirelessly encoded in the respective second memory. For each segment of the segmental wireless flexible product, a respective correlation between the respective first and second globally unique component device identifiers is stored in an association module. A query comprising any of the globally unique component device identifiers of a given segment returns a respective set of each of the globally unique component device identifiers associated with the given segment of the segmental wireless flexible product.

In another aspect, a reader/writer system is configured to generate a list of unique identifiers associated with respective segments of a segmental wireless flexible product comprising respective globally unique component device identifiers for tracking. The reader/writer comprises an interface electrically coupled to circuitry modules comprising: RF scanning circuitry configured to establish wireless connections with respective segments of the segmental wireless flexible product associated with ones of the assets/packages and read respective ones of globally unique component device identifiers from the respective first memories of segments of the segmental wireless flexible product; and RFID scanning circuitry configured to read respective ones of globally unique component identifiers from the respective second memories of segments of the segmental wireless flexible product associated with ones of the assets/packages. The interface enables reading the first and second globally unique component identifiers from the first and second memories of the segmental wireless flexible product to generate a list of tracked assets/packages, where a query comprising any of the globally unique component device identifiers of a given segment returns a respective set of each of the globally unique component device identifiers associated with the given segment of the segmental wireless flexible product.

In one embodiment, a method fabricates a segmental multimode wireless flexible product having associated identifiers. An RFID inlay is attached on a cover of, and aligned with, at least one segment of a tracking wireless flexible product. The at least one segment of the tracking wireless flexible product having the cover and a substrate that encapsulates a wireless communications interface, a processor, and a first memory storing a first unique identifier associated with an electronic component of the tracking wireless flexible product. The RFID inlay having a second memory storing a second unique identifier associated with the RFID inlay.

In another embodiment, a segmental multimode wireless flexible product printer includes: a printhead having an RFID encoder module and a barcode printer module; a transport mechanism for moving a wireless flexible product past the printhead; and a print controller having a first processor and first memory storing machine readable instructions that when executed by the first processor cause the first processor to: control the transport mechanism move a tracking wireless flexible product past the printhead, wherein each of at least one segment of the tracking wireless flexible product is formed with a cover and a substrate that encapsulates a wireless communications interface, a second processor, and a second memory storing a first unique identifier; control the printhead to print, on the cover of, and aligned with, the at least one segment of the tracking wireless flexible product, an RFID inlay having a third memory storing a second unique identifier; and store the first unique identifier in association with the second unique identifier in an association database, wherein the association allows a set of the first unique identifier and the second unique identifier corresponding to the segment to be returned in response to a query containing any one of the first unique identifier and the second unique identifier.

In another embodiment, a segmental multimode wireless flexible product having associated identifiers, includes: a cover; a substrate that encapsulates a wireless communications interface, a processor, and a first memory storing a first unique identifier; and an RFID inlay located on the substrate having a second memory storing a second unique identifier. The first unique identifier and the second unique identifier are correlated in an association database external to the segmental multimode wireless flexible product to allow a set of the first unique identifier and the second unique identifier to be returned in response to a query containing any one of the first unique identifier, the second unique identifier, and the third unique identifier.

The invention also features apparatus operable to implement the method described above and computer-readable media storing computer-readable instructions causing a computer to implement the method described above.

DETAILED DESCRIPTION

Figure 1A:
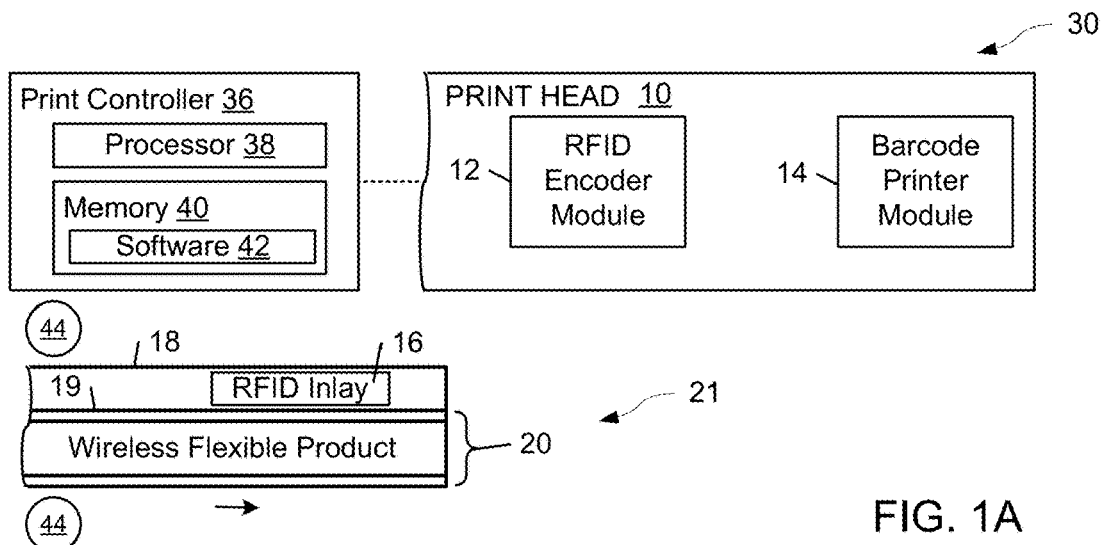
FIGS. 1A, 1B, and 1C are schematic views of different stages in an example process for fabricating a segmental multimode wireless flexible product, in embodiments.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

INTRODUCTION

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

Example embodiments described herein generally relate to identification systems and methods for automatically associating/correlating two or more identifiers that bridge different identification systems and, in some examples, relate to systems, methods, and computer program instructions for automatically associating/correlating identifiers for shipping, tracking, logistics, and other purposes.

In the following description, like reference numbers are used to identify like elements. Furthermore, the drawings are intended to illustrate major features of exemplary embodiments in a diagrammatic manner. The drawings are not intended to limit the disclosed aspects nor depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," and "unit" refer to hardware, software, or firmware, or a combination thereof.

Example Embodiments

In an example scenario, a supply chain involves a company, a supplier, and a customer. The supplier provides goods (products, assets, etc.) and/or services to the company. The supplier and the company may manage different aspects of a task associated with the supply chain in different ways and using different technology. For example, the company may handle the shipment of the goods to the company's customer, whereas the supplier may manage tracking and monitoring of the shipped goods. In the examples described herein, the company has its own information technology process for identifying the goods (e.g., assets or items) being shipped. For example, the company may use a particular parcel tracking identification mechanism that is different from the supplier's parcel's tracking identification mechanism. In addition, the company and the supplier may use different asset identification technologies, including radio frequency (RF) technologies, radio frequency identification (RFID) technologies, and optical barcode technologies. Certain aspects of the present embodiments include the realization that automated identification techniques are needed that seamlessly and accurately bridge the differences between the company's and the supplier's identification systems to enable more useful and advanced product and service offerings such as real-time tracking of shipment location and monitoring status.

Figure 1B:
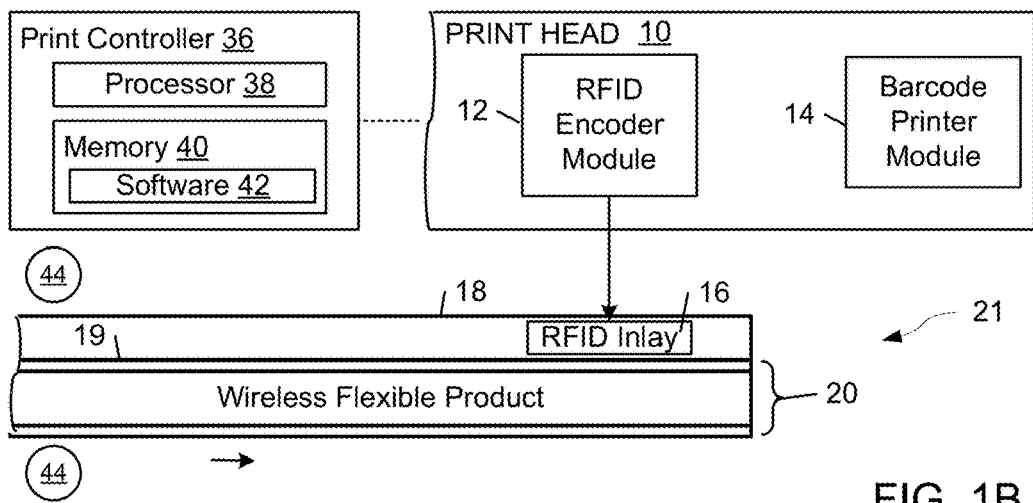
Figure 1C:
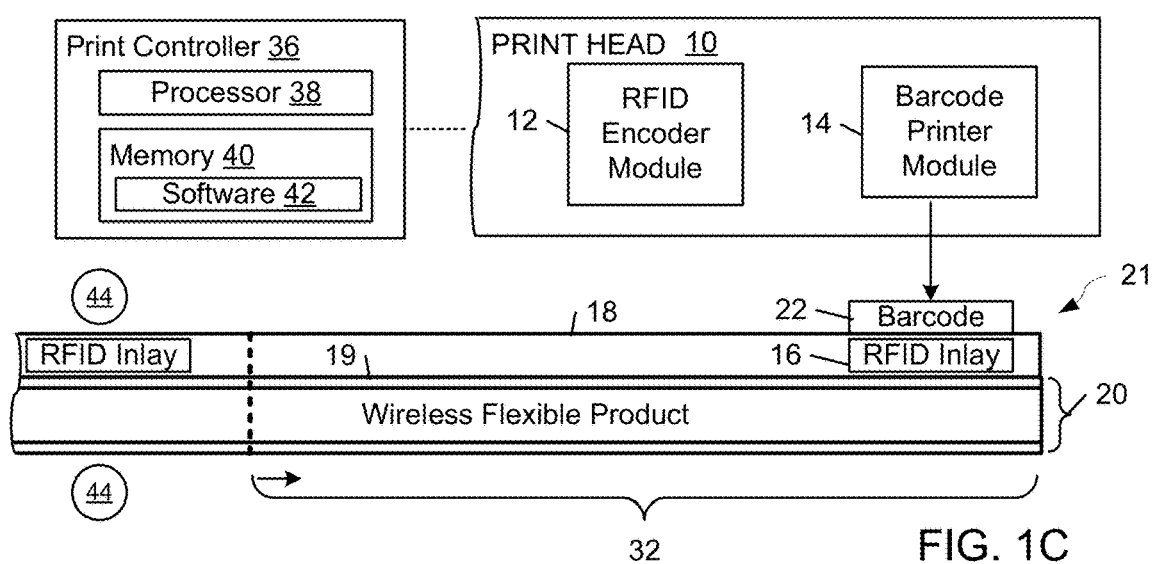

FIGS. 1A, 1B, and 1C show schematic views of different stages in an example process of fabricating a segmental multimode wireless flexible product 21. FIGS. 1A, 1B and 1C are best viewed together with the following description.

FIG. 1A shows a block diagram of an example segmental multimode wireless flexible product printer 30 that includes a print controller 36, a transport mechanism 44, and a print head 10 with an RFID encoder module 12 and a barcode printer module 14. The print controller 36 includes a processor 38 and a memory 40 that stores software 42 having machine readable instructions that, when executed by the processor 38, cause the print controller 36 to implement functionality of the segmental multimode wireless flexible product printer 30 as described herein. In one example of operation, the print controller 36 controls the transport mechanism 44 to move a tracking wireless flexible product 20 past the print head 10, and control the RFID encoder module 12 and the barcode printer module 14 to enhance the tracking wireless flexible product 20 to form the segmental multimode wireless flexible product 21. One segment of the segmental multimode wireless flexible product 21 may also be referred to as a tape node hereinafter.

In one example, the supplier receives a roll of the tracking wireless flexible product 20 from its manufacturer and uses printer 30 to generate (e.g., print) the segmental multimode wireless flexible product 21 as needed. In another example, the company receives a roll of the tracking wireless flexible product 20 from its manufacturer and uses printer 30 to generate (e.g., print) the segmental multimode wireless flexible product 21 as needed. In another example, the manufacturer of the tracking wireless flexible product 20 uses printer 30 to generate (e.g., print) the segmental multimode wireless flexible product 21 which is shipped to one of the supplier or the company. The unique identifiers used with the segmental multimode wireless flexible product 21 may be generated during manufacture and/or printing of the segmental multimode wireless flexible product 21 using a global system similar to the way MAC addresses are generated. The RFID encoder module 12 is configured to read data from, or to write data to, an RFID inlay 16, which includes an antenna and a memory device (e.g., a microchip memory). In the illustrated example, the RFID inlay 16 is encapsulated within a label 18 that includes an adhesive layer 19 that adheres the RFID inlay 16 to the tracking wireless flexible product 20 to form the segmental multimode wireless flexible product 21. In one example, a server (e.g., server 202, FIG. 4B) may generate the unique identifiers, control the printer 30 to print the segmental multimode wireless flexible product 21, and update a database (e.g., database 238, FIG. 4B) for correlating the unique identifiers of the segmental multimode wireless flexible product 21 as described in detail below (see FIG. 4B and associated description). For example, printer 30 may read an RF identifier from a current segment of the tracking wireless flexible product 20, read an RFID identifier from the RFID inlay 16, and then correlated the RF identifier, the RFID identifier, and a barcode identifier of the barcode 220 being printed to form the segmental multimode wireless flexible product 21. In certain embodiments, a user, or a server, or a client device may provide an RF identifier of the tracking wireless flexible product 20 (e.g., of the current segment) to the printer 30, when the blank tape segments are loaded. In another example, the tracking wireless flexible product 20 may communicate with the printer 30 to provide its RF identifier. In another example, the tracking wireless flexible product 20 may communicate its position on a sheet of labels (e.g., first segment, second segment, etc.) when loaded into the printer 30.

The tracking wireless flexible product 20 includes functionality for tracking and monitoring assets (e.g., goods, parcels, packages, containers) to which the tracking wireless flexible product 20 is attached. A detailed description of the tracking wireless flexible product 20 is described below with reference FIGS. 3A and 3B.

FIG. 1B is a diagrammatic view showing the RFID encoder module 12 wirelessly writing data to, or reading data from, an RFID memory of the RFID inlay 16. In certain embodiments, the stored data is protected using on-chip cryptographic methods that render the stored data untraceable, enable authentication of tag and reader/writer communications, and enable secure wireless communications.

FIG. 1C is a diagrammatic view showing the barcode printer module 14 printing a barcode 22 over the RFID inlay 16 on the tracking wireless flexible product 20. However, the barcode 22 may be printed on any part of the tracking wireless flexible product 20 without departing from the scope hereof. The barcode 22 may be any type of optical barcode format, including a linear barcode format and a matrix (2D) barcode format.

Figure 2:
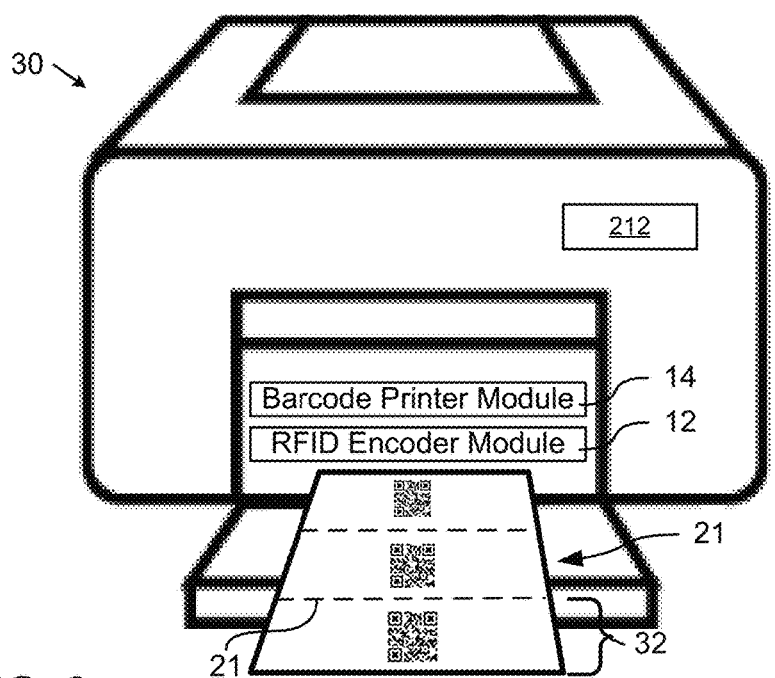
FIG. 2 is a diagrammatic front view of an example system for fabricating a segmental multimode wireless flexible product, in embodiments.

FIG. 2 is a schematic showing an example segmental multimode wireless flexible product printer 30 that includes the RFID encoder module 12 and the barcode printer module 14 generating the segmental multimode wireless flexible product 21. As described above, the RFID encoder module 12 writes data to the memory of the RFID inlay 16, and the barcode printer module 14 prints an optical barcode over the RFID inlay 16. In some embodiments, the RFID inlay 16 and the associated barcode 22 are fabricated roll-to-roll or sheet-to-sheet. In the illustrated embodiment, the RFID inlay 16 and the associated barcode 22 are fabricated sheet-to-sheet, where each segmental sheet is partitioned into segments 32, each of which includes at least one segmental multimode wireless flexible product 21, at least one barcode 22, and at least one RFID inlay 16.

In some examples, each segment 32 of the segmental multimode wireless flexible product 21 includes markings (e.g., writing, printing, embossing, engraving, etching, etc.) that may convey instructions, warnings, or other information to a person or machine (e.g., a bar code reader), or may simply be decorative and/or entertaining. In the illustrated example, the segment 32 of the segmental multimode wireless flexible product 21 includes a two-dimensional barcode 22, and an associated cut line 34 that indicates where a user should cut the segmental multimode wireless flexible product 21. The cut line 34 typically is printed or otherwise marked on the top surface of the segmental multimode wireless flexible product 21 during manufacture. The two-dimensional barcode 22, on the other hand, may be marked on the top surface of the segmental multimode wireless flexible product 21 during manufacture of the segmental multimode wireless flexible product 21 or, alternatively, may be marked on the segmental multimode wireless flexible product 21 as needed, using, for example, a printer or other marking device.

To avoid damage to the tracking functionality of the segments 32 of the segmental multimode wireless flexible product 21, the cut lines 34 typically demarcate the boundaries between adjacent segments 32 at locations free of any tracking components. The spacing between the tracking components and the cut lines 34 may vary depending on the intended tracking application or the intended adhesive application. In some examples, the length of the segmental multimode wireless flexible product 21 that is dispensed to seal a package containing an asset corresponds to a single segment 32 of the segmental multimode wireless flexible product 21. In other examples, the length of segmental multimode wireless flexible product 21 needed to seal a package containing an asset or otherwise serve the adhesive function for which the segmental multimode wireless flexible product 21 is being applied may include multiple segments 32, one or more of which segments 32 may be activated upon cutting the length of the segmental multimode wireless flexible product 21 from a roll and/or applying the length of the segmental multimode wireless flexible product 21 to the package.

In some examples, the tracking components that are embedded in one or more segments 32 of the tracking wireless flexible product 20 are activated when the segmental multimode wireless flexible product 21 is cut along the cut line 34. In these examples, the segmental multimode wireless flexible product 21 includes one or more embedded energy sources (e.g., thin film batteries or conventional cell batteries, such as conventional watch style batteries) that supply power to the tracking components in one or more segments of the segmental multimode wireless flexible product 21 in response to being separated from the roll or sheet (e.g., along a cut line 34).

In some examples, each segment 32 of the segmental multimode wireless flexible product 21 includes its own respective energy source. In some of these examples, each energy source is configured to only supply power to the components in its segment 32 regardless of the number of contiguous segments 32 that are in a given length of the segmental multimode wireless flexible product 21. In other examples, when a given length of the segmental multimode wireless flexible product 21 includes multiple segments 32, the energy sources in the respective segments 32 are configured to supply power to the tracking components in all of the segments 32 in the given length of the segmental multimode wireless flexible product 21. In some of these examples, the energy sources are connected in parallel and concurrently activated to power the tracking components in all of the segments 32 at the same time. In other ones of these examples, the energy sources are connected in parallel and alternately activated to power the tracking components in respective ones of the tracking wireless flexible product 20 at different time periods, which may or may not overlap.

Figure 3A:
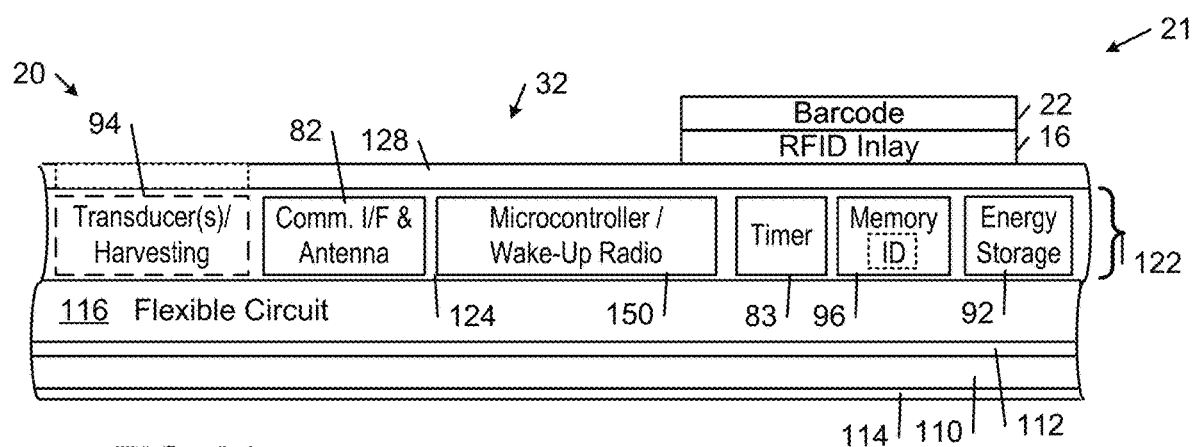
FIG. 3A is a diagrammatic cross-sectional side view of an example segmental multimode wireless flexible product, in embodiments.

FIG. 3A is a schematic showing a cross-sectional side view of one segment 32 of the segmental multimode wireless flexible product 21. The segment 32 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 32 from a surface on which the adhesive layer 114 is adhered without destroying the physical or mechanical integrity of the segment 32 and/or one or more of its constituent components. In some embodiments, the optional flexible substrate 110 is implemented as a prefabricated adhesive tape that includes the adhesive layers 112, 114 and the optional release liner. In other embodiments, the adhesive layers 112, 114 are applied to the top and bottom surfaces of the flexible substrate 110 during the fabrication of the segmental multimode wireless flexible product 21. The adhesive layer 112 bonds the flexible substrate 110 to a bottom surface of a flexible circuit 116 that includes one or more wiring layers (not shown) that electrically interconnect the microcontroller/wake-up radio circuit 150, the wireless communication interface and antenna circuit 82, the transducer(s)/harvesting 94, the memory 96, and other components that form a device layer 122, and to the energy storage device 92 and/or transducer(s)/harvesting 94 components and, thereby, enable the wireless transducing, tracking and other functionalities of the segmental multimode wireless flexible product 21. In some examples, a flexible polymer layer 124 encapsulates components of the device layer 122 and thereby reduces the risk of damage that may result from the intrusion of contaminants and/or liquids (e.g., water). The flexible polymer layer 124 also planarizes the device layer 122 to facilitate optional stacking of additional layers on the device layer 122, and also distributes forces generated in, on, or across the segmental multimode wireless flexible product 21 to reduce potentially damaging asymmetric stresses that may be caused by the application of bending, torqueing, pressing, or other forces on the segmental multimode wireless flexible product 21 during use. In certain embodiments, a flexible cover 128 is bonded to the flexible polymer layer 124 by an adhesive layer (not shown).

The flexible cover 128 and the flexible substrate 110 may have the same or different compositions depending on the intended application. The flexible cover 128 and the flexible substrate 110 typically include flexible film layers and/or paper substrates, which may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, these adhesive layers are applied to the flexible cover 128 and the flexible substrate 110 during manufacture of the segmental multimode wireless flexible product 21 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In certain embodiments, the flexible polymer layer 124 is composed of a flexible epoxy (e.g., silicone).

In some embodiments, the energy storage device 92 is a flexible battery formed with a printed electrochemical cell, which includes a planar arrangement of an anode and a cathode and battery contact pads. The flexible battery may include either lithium-ion cells or nickel-cadmium electrochemical cells and may be formed by a process that includes printing or laminating the electro-chemical cells on a flexible substrate (e.g., a polymer film layer). Other components may be integrated on the same substrate as the flexible battery. For example, one or more of the flexible antennas, wireless communication interface and antenna circuit 82, and/or a microcontroller/wake-up radio circuit 150 may be integrated with the energy storage device 92 on the flexible circuit 116. In some examples, one or more of these other components (e.g., the flexible antennas and the wiring layers) may be printed onto the flexible circuit 116.

In certain embodiments, the flexible circuit 116 is formed by printing, etching, or laminating circuit patterns onto a flexible substrate. In other embodiments, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through-holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

Figure 3B:
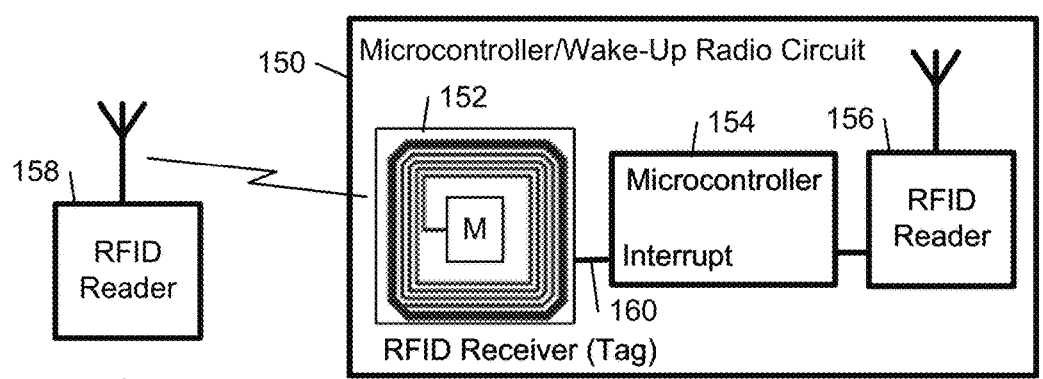
FIG. 3B is a diagrammatic view of a microcontroller administered wake-up radio component of the example a segmental multimode wireless flexible product show in FIG. 3A, in embodiments.

As shown in FIG. 3B, microcontroller/wake-up radio circuit 150 includes an RFID receiver circuit 152 (e.g., an RFID tag), a microcontroller 154, and an RFID reader 156. The microcontroller/wake-up radio circuit 150 may be fabricated on the flexible circuit 116. The RFID receiver circuit 152 electrically connects to an interrupt pin 160 of the microcontroller 154 that has an output pin that electrically connects to an input of the RFID reader 156. In one example of operation, the transmission of a packet from a nearby RFID reader 158 energizes the RFID receiver circuit 152, which generates an interrupt signal that wakes the microcontroller 154, which in turn wakes the RFID reader 156 to detect the transmitted packet without requiring scheduled communications or cutting circuit connections to wake the circuits.

In certain embodiments, in an analogous way, microcontroller/wake-up radio circuit 150 may implement a near-field communication (NFC) receiver/reader circuit allowing an NFC signal to wake-up an NFC reader.

Figure 4A:
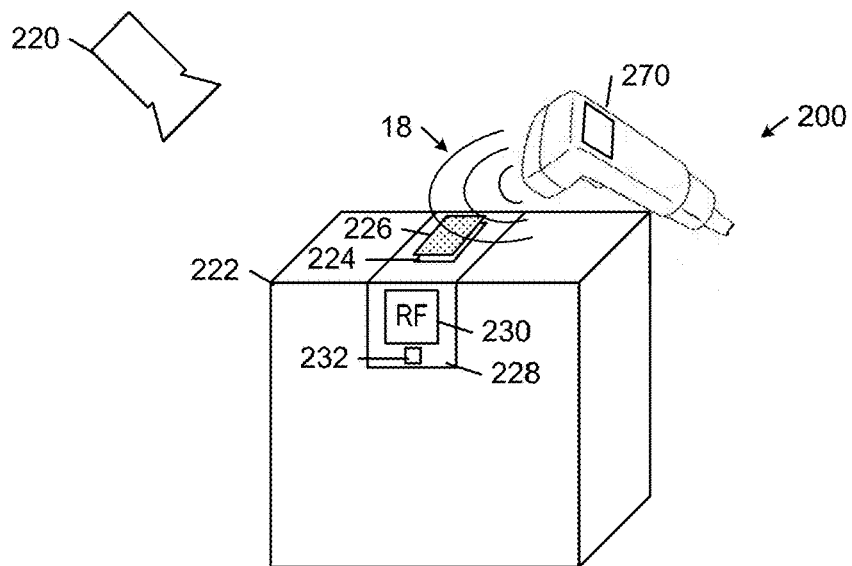
FIG. 4A is a schematic diagram of a multimode wireless scanner device for reading and correlating asset identifiers, in embodiments.
Figure 4B:
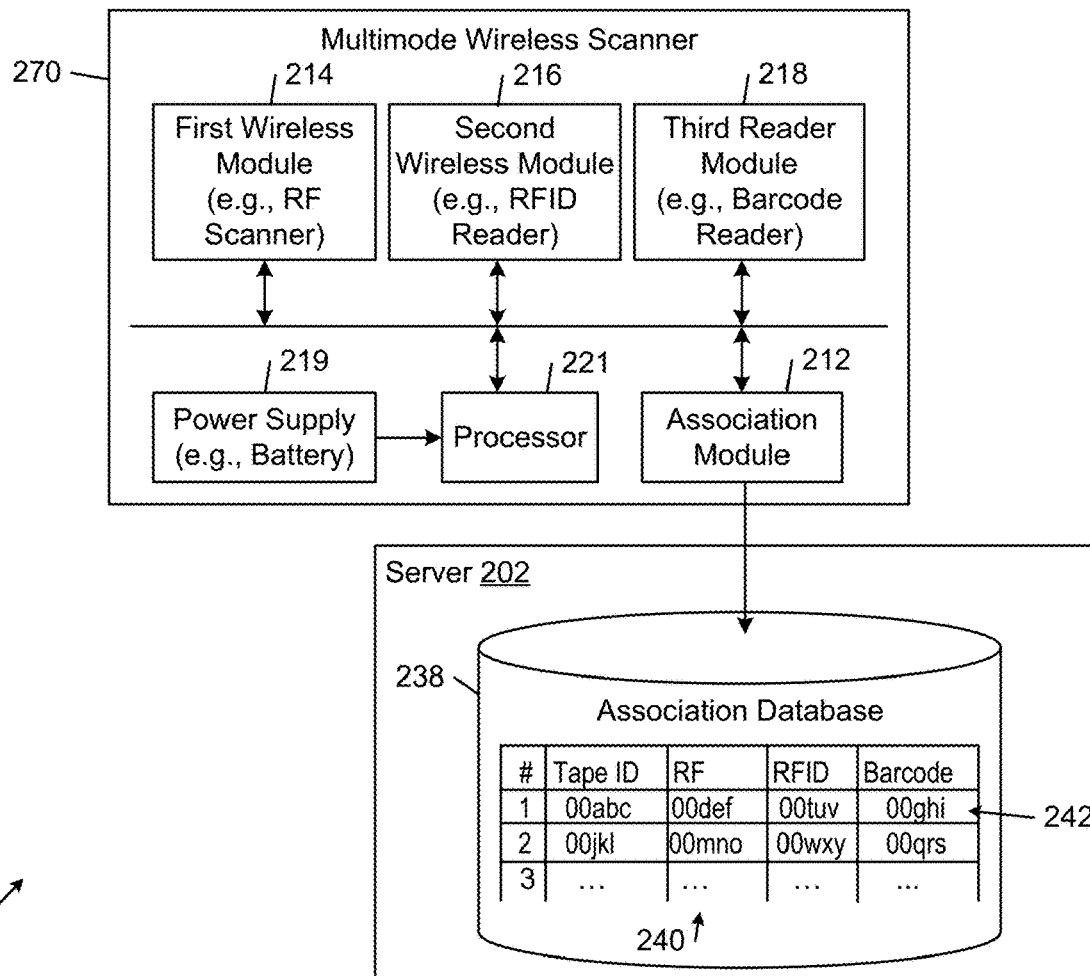
FIG. 4B is a block diagram of example components of the multimode wireless scanner device shown in FIG. 4B and an example database storing associations between correlated identifiers, in embodiments.

FIGS. 4A-4B show one example system 200 for reading and correlating identifiers from a segmental multimode wireless flexible product 228 attached to an asset 222. System 200 may be implemented, at least in part, in a computer server 202. The asset 222 may be any type of good or other item. In the illustrated example, the asset 222 is depicted as a box containing one or more goods or other assets. The segmental multimode wireless flexible product 228 may represent the segmental multimode wireless flexible product 21 of FIGS. 1A, 1B, 1C, 2, and 3A. FIGS. 4A and 4B are best viewed together with the following description.

The segmental multimode wireless flexible product 228 may include a first asset tag 224, a second asset tag 226, and a wireless product tag 230. The first and second asset tags 224, 226 may be associated with the company and the wireless product tag 230 may be associated with the supplier. In some examples, each of the first asset tag 224 and the second asset tag 226 may include either a RFID tag that is configured with a respective globally unique identification number or a barcode that is configured with a respective a globally unique identification number. The barcode may be any type of one-dimensional barcode (also referred to as a linear barcode) or may be any type of two-dimensional barcode (also referred to as a matrix barcode). In an illustrative non-limiting example of the embodiment shown in FIG. 4A, the first asset tag 224 is a RFID tag, the second asset tag 226 is a barcode. The wireless product tag 230 may be any type of RF wireless communications tag. The wireless product tag 230 may operate according to a different wireless protocol (e.g., WIFI, Bluetooth, LoRaWAN, near field communication (NFC), Cellular, etc.) than the RFID tag.

In the embodiment shown in FIG. 4A, the system 200 is implemented as a multimode wireless scanner 270 that includes a first wireless module 214 (e.g., RF transceiver), a second wireless module 216 (e.g., RFID scanner), a third reader module 218 (e.g., a barcode reader), a power supply 219 (e.g., a battery), and a processor 221. The multimode wireless scanner 270 further includes an association module 212, implemented as software or firmware that includes machine readable instructions executable by the processor 221.

The first wireless module 214 is a wireless RF scanner device that is configured to communicate with the first wireless product tag 230 using a first wireless protocol. The first wireless module 214 may implement one or more of a Bluetooth scanner (e.g., a Bluetooth Low Energy scanner) using a Bluetooth protocol, a near field communication (NFC) scanner using an NFC protocol, a LoRaWAN scanner using a LoRaWAN protocol, and a cellular scanner using a cellular protocol. For example, the type of the first wireless module 214 is selected based on the type of the wireless product tag 230. In this example, the first wireless module 214 is a Bluetooth Low Energy (BLE) scanner configured to communicate with the wireless product tag 230, which is a BLE wireless tag, using the Bluetooth wireless protocol. In one example of operation, the first wireless module 214 transmits a wireless signal that includes a specific authentication identifier and credentials. When the wireless product tag 230 receives the wireless signal, the wireless product tag 230 establishes communication using a handshake with the first wireless module 214 on a corresponding advertisement channel of the used protocol. Then the wireless product tag 230 hands off communication with the first wireless module 214 to a data channel (e.g., a BLE data channel). The wireless product tag 230 may decode a product identification number (PIN) and a type identification number (TIN) of the multimode wireless scanner 270 from the first wireless module 214 and in response the segmental multimode wireless flexible product 228 may transmit that information to the system 200 to inform the system of the established communication with the multimode wireless scanner 270. Scanners and peripheral adhesive product tags for LoRaWAN, cellular, ZigBee, and other wireless communications operate in accordance with analogous communications protocols. The segmental multimode wireless flexible product 228 includes one or more wireless communication radios that implement one or more different protocols including Bluetooth, LoRa, cellular, satellite, and others. The segmental multimode wireless flexible product 228 may thereby communicate directly with the Internet and or server 202 either directly or by relaying through other communication devices, e.g., other segmental multimode wireless flexible products 228 (e.g., tape nodes), gateway devices, client devices, and so on.

The second wireless module 216 may be an RFID reader module that interrogates the first asset tag 224, when the first asset tag 224 is an RFID based tag, using a second wireless protocol that is different from the first wireless protocol. The second wireless module 216 operates within the frequency range of the first asset tag 224. The first asset tag 224 may respond to the second wireless module 216 when in range by transmitting a fixed packet of data (e.g., read-only data) that is received by the second wireless module 216. The first asset tag 224 may be reprogrammable, at least in part, with different data, as needed. A wireless communication range of the second wireless module 216 may be from ten to one-hundred centimeters. However, for certain applications, the wireless communication range of the second wireless module 216 is from 5 centimeters to 20 centimeters. Data is transmitted on modulated radio frequency electromagnetic waves between the second wireless module 216 and the first asset tag 224. For example, the second wireless module 216 transmits an electric or magnetic field that is sensed by the first asset tag 224, and in response, the first asset tag 224 transmits data (including a globally unique identification number) that may be stored in a memory component (e.g., a microchip) of the first asset tag 224.

The first asset tag 224 is one of an active RFID tag or a passive RFID tag. When implemented as an active RFID tag, the first asset tag 224 includes a local power sources (e.g., a battery) that provides power to the first asset tag 224 for sending data packets to an RFID reader module. When implemented as a passive RFID tag, the first asset tag 224 does not include any local power sources; instead, the first asset tag 224 is powered by inductive or capacitive coupling between a RFID reader module and the first asset tag 224. For example, the first asset tag 224 may couple to the magnetic fields generated by the second wireless module 216. In embodiment, each of the second wireless module 216 and the first asset tag 224 includes a respective set of one or more electrically conducting coils. The second wireless module 216 uses its power source to generate an electric current in the set of coils to generate magnetic fields that induce a current in the set of coils in the first asset tag 224. The induced current powers the first asset tag 224 to generate a wireless RFID signal that is transmitted to the second wireless module 216. In another example, the first asset tag 224 may capacitively couple with the second wireless module 216 using capacitive coupling plates. For example, the second wireless module 216 generates an alternating electric field at the coupling plates that causes the first asset tag 224 to transfer data to the second wireless module 216. However, capacitively coupled RFID reader modules and tags only transfer information across short distances and therefore are typically limited to near-field applications.

The third reader module 218 may be a barcode reader module that is configured to read the second asset tag 226 that includes a barcode. In one example, the third reader module 218 includes a terminal device and a decoder processing unit. The terminal device may include a light source, a lens, and a light sensor that converts optical impulses reflected from the barcode into electrical signals that are input into a decoder circuit in the decoder processing unit. The decoder circuit processes the barcode image data captured by the light sensor to generate electrical output data, which may include, for example, a globally unique identification number associated with the barcode. In certain embodiments, the decoder processing unit is incorporated into the multimode wireless scanner 270 (e.g., implemented by processor 221). In other embodiments, the decoder processing unit is external from the multimode wireless scanner 270 (e.g., incorporated into a network server or other processing device).

In certain embodiments, the multimode wireless scanner 270 may include only the first wireless module 214 and the second wireless module 216. In this embodiment, the third reader module 218 may be incorporated into an external imaging component that is in communication with system 200. For example, the external imaging component may be a camera 220 configured to capture at least one image of the second asset tag 226 (e.g., the barcode) and to send the image to an image processing module (e.g., included in the association module 212 or included in an intermediate decoder module) that is configured to analyze and process the image and decode the barcode to generate output data that include the globally unique identification numbers or other data encoded within the barcode. In this example, the camera 220 may implement the imaging functions similar to the third reader module 218 (including the terminal device), and the association module 212 analyzes and decodes the image of the barcode to generate the output data.

As explained above, in some cases, coordination of activities performed by a supplier and a company are hampered when the supplier and company utilize different systems of identification. The segmental multimode wireless flexible product 228 solves this problem by integrating a variety of functions including adhesive tape functions (e.g., sealing assets), adhesive label functions (e.g., labeling assets), sensing functions (e.g., monitoring or sensing the status or state of a shipment), and wireless communications functions (e.g., tracking locations of assets and reporting asset status and condition). Continuing with the example of FIG. 4A, the supplier provides the company with the segmental multimode wireless flexible product 228 and associated tracking and reporting services. The segmental multimode wireless flexible product 228 may be divided into segments (e.g., see segment 32 of FIGS. 1C, 2, and 3A), where each segment of the segmental multimode wireless flexible product 228 includes multiple respective globally unique identifier stored in its wireless product tag 230, first asset tag 224 and second asset tag 226. In another example, the supplier and the company may use the same unique identifiers.

In this example, the company and the supplier use different ones of the unique identifiers to identify assets that are packaged and shipped. The company may use unique identifiers from one or both of the first asset tag 224 and the second asset tag 226 to identify the company's assets, whereas the supplier may use a unique identifier stored in the wireless product tag 230. Advantageously, the segmental multimode wireless flexible product 228 combines the wireless product tag 230, the first asset tag 224 and the second asset tag 226 into a single product, to fulfil the needs of both the supplier and the company, and the association module 212 of the system 200 further associates/correlates the unique identifiers with one another as being part of the same segment of the segmental multimode wireless flexible product 228.

The association module 212 receives data read from each of the wireless product tag 230, the first asset tag 224 and the second asset tag 226, and associates/correlates the unique identifiers of each tag when they are from the same segmental multimode wireless flexible product 228. For example, the multimode wireless scanner 270 may read the unique identifiers from each of the wireless product tag 230, the first asset tag 224 and the second asset tag 226, and determine that they are from the same segmental multimode wireless flexible product 228 based on its limited wireless range and its proximity to the segmental multimode wireless flexible product 228. These associations and determinations may be made recursively, so that multiple unique identifier associations may be chained together. For example, where multiple segments of the segmental multimode wireless flexible product 228 are used together to close a package containing the asset, the unique identifiers from multiple wireless product tags 230, multiple first asset tags 224 and multiple second asset tags 226, may be associated together.

In certain embodiments, the association module 212 includes programmatic methods and heuristics for associating/correlating one or more unique identifiers stored in the segmental multimode wireless flexible product 228 with a different unique identifier generated by the company's identification system. Advantageously, the association module 212 "bridges the gap" between globally unique identifier used by the supplier and stored in the wireless product tag 230, and one or both of the unique identifiers stored in the first asset tag 224 and the second asset tag 226 that are used by the company.

In certain embodiments, the association module 212 may ensure tags satisfy a temporal or spatial proximity condition with respect to each other. Examples of temporal and spatial proximity conditions include: (1) a determination that one tag and another tag are both proximate each other; (2) a determination that one tag and another tag both appear in a single image of the segmental multimode wireless flexible product 228; and (3) a determination that one tag and another tag are read contemporaneously.

In certain embodiments, the association module 212 may use one or more intermediate identifiers to make the associations/correlations. In this embodiment, instead of reading the unique identifier from the wireless product tag 230 and directly associating/correlating it with the unique identifier read from the first asset tag 224 on the asset 222, an intermediate identifier is read from an additional RFID tag 232 included in the same segment of the segmental multimode wireless flexible product 228 as the wireless product tag 230. RFID tag 232 may represent RFID receiver circuit 152 of FIG. 3A, for example. Advantageously, the RFID tag 232 may be read contemporaneously with the first asset tag 224 using an RFID reader (e.g., second wireless module 216), and therefore allows the use of a simpler RFID reader by the company since it does not require the use of first wireless module 214. The supplier may store the association/correlation between the identifier of the wireless product tag 230 and the identifier of the RFID tag 232 in an association database 238, which may be implemented in the cloud by a computer server 202 for example. In certain embodiments, the RFID tag 232 may be programmed by the supplier (e.g., using segmental multimode wireless flexible product printer 30 of FIGS. 1A, 1B, 1C, and 2) to store the unique identifier of the wireless product tag 230, thereby making it accessible to an RFID reader (e.g., therefore not requiring an RF reader to learn the unique identifier). In other embodiments, the association/correlation between the identifier of the wireless product tag 230 and the identifier of the RFID tag 232 in one or both of the memory of the wireless product tag 230 and/or the memory of the RFID tag 232.

As described in the above examples, the third reader module 218 may be a barcode reader module for reading the second asset tag 226, which includes a barcode. In one example, the association module 212 associates an identifier read from the barcode of the second asset tag 226 with the identifier read from the first asset tag 224 based on an image of the asset 222 that is captured by the camera 220 and the captured image includes the first and second asset tags 224 and 226.

In certain embodiments. the association module 212 may be implemented in the printer 30 of FIGS. 1A, 1B, 1C, and 2, thereby providing printer 30 with the ability to associate/correlate the unique identifiers of the segmental multimode wireless flexible product 21.

Figure 7:
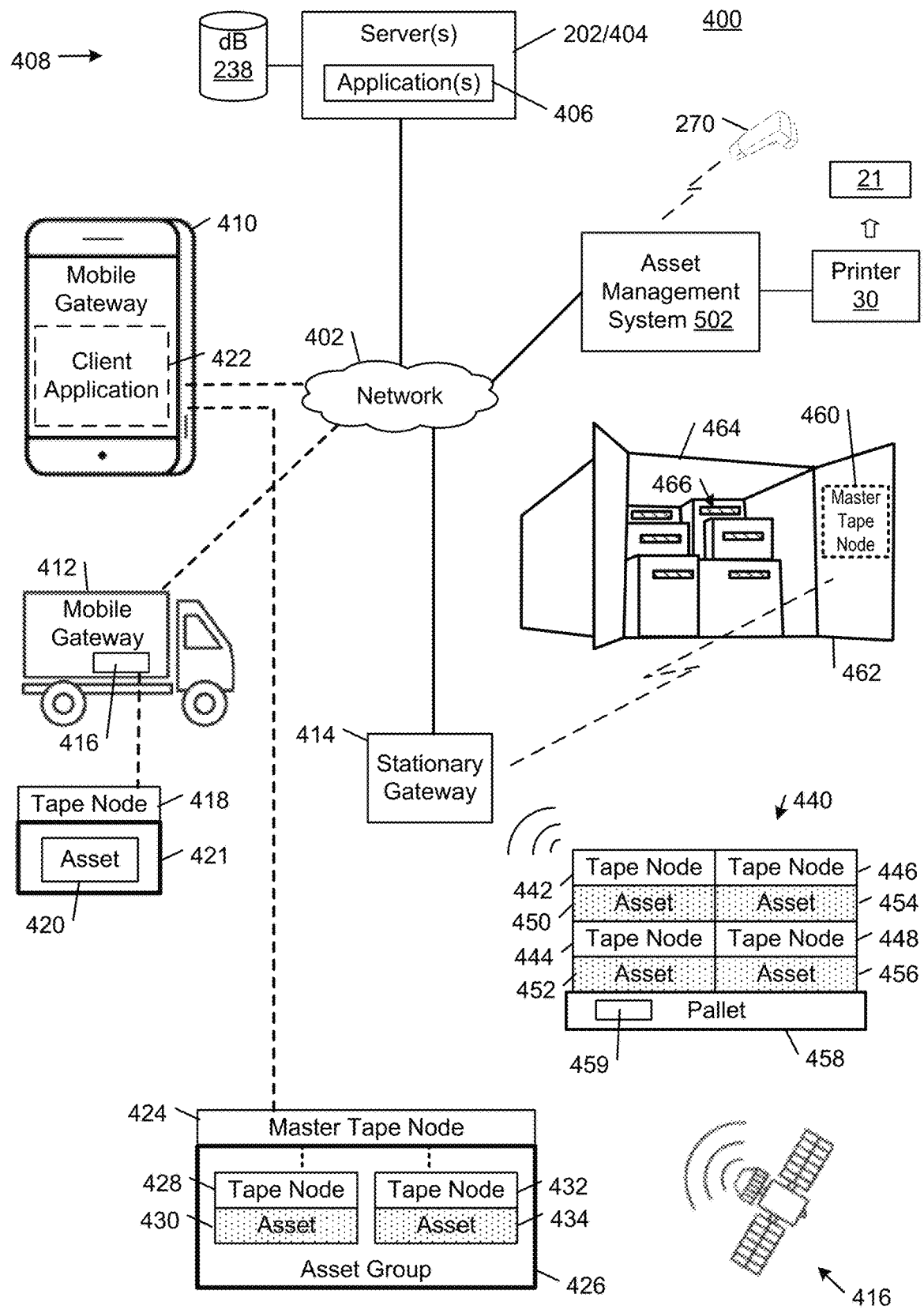
FIG. 7 is a diagrammatic view of an example network environment supporting communications with segments of the segmental multimode wireless flexible product of FIGS. 1A, 1B, and 1C, in embodiments.

In certain embodiments, the association module 212 stores the determined chain of associations between the different identifiers in a table 240 of the database 238 as shown in FIG. 4B. FIG. 7 shows one example network 402 illustrating communication of the unique identifiers of the segmental multimode wireless flexible product 228 to the database 238. The table 240 may be used by an asset management system 502 to track assets, monitor the status or state of a particular asset, and report the status and condition of an asset. In one example, RFID scanner 270 of the asset management system 502, or the asset management system 502 itself, communicates via a network 402 (e.g., via the Internet, Wi-Fi, via a relay device, a gateway, and/or a tape node) with the server 202 to access the database 238. In the example of FIG. 7, the asset management system 502 controls the printer 30 to generate the segmental multimode wireless flexible product 228 (shown as segmental multimode wireless flexible product 21 in FIG. 7) with at least two different unique identifiers. In one embodiment, printer 30 reads two of the unique identifiers (e.g., RF identifier and RFID identifier) from the tracking wireless flexible product 20, and encodes the third unique identifier (e.g., barcode identifier) in a barcode printed onto the segmental multimode wireless flexible product 228. In another example, the multimode wireless scanner 270 scans the three unique identifiers from the segmental multimode wireless flexible product 228 once generated by the printer 30, or received from a manufacturer of the segmental multimode wireless flexible product 228. For example, the multimode wireless scanner 270 may read the three unique identifiers from the segmental multimode wireless flexible product 228 when at least one segment thereof it attached to an asset (e.g., package). The asset management system 502 then sends the three unique identifiers for association within the database 238 via the network 402 and the server 202 for example. In other embodiments, one or both of the printer 30 and the multimode wireless scanner 270 may send the unique identifiers of the segmental multimode wireless flexible product 228 to the server 202 via the network 402.

As shown in FIG. 4B, the table 240 of identifiers is organized with each row containing identifiers associated with one segment of the segmental multimode wireless flexible product 228 (e.g., also with a respective asset). For example, row 1 associates the identifiers corresponding to a first asset, row 2 associates the identifiers corresponding to a second asset, and so on. Each row of the table 240 enables the supplier (or any other entity with access to association database 238) to generate a report including of the location, status, and condition of an identified asset as it travels through a logistics network by associating, for example, a scanned bar code identifier or a transmitted RFID data packet with the identifier of the corresponding wireless product tag 230. If multiple segmental multimode wireless flexible products 228 are located on a given asset, the association database 238 will indicate such, and scanning of any one of the wireless product tag 230, first asset tag 224 and second asset tag 226 on any of the multiple segment multimode wireless flexible products will provide access to data from all of the multiple segment multimode wireless flexible products previously associated with a given asset. As an asset is transported, the segmental multimode wireless flexible product 228 (e.g., one or more segments thereof) attached to the asset (or packaging) may be scanned by various entities using any type of reading device (e.g., not all readers/scanners are configured to real all three unique identifiers). For example, at least one of the unique identifiers may be read when (a) the asset is being packaged and prepared for shipping by a company, (b) the asset is loaded into a shipping container or shipment vehicle, (c) the asset is received at a distribution center or a shipping/receiving center, and (d) the asset arrives at its destination.

Other unique identifiers may also be associated and correlated with the unique identifiers of the segmental multimode wireless flexible product 228. In one example scenario, a tray of vials, or each individual vial (healthcare, medical applications) has an attached RFID tag. One segmental multimode wireless flexible product 228 may also be attached to the tray, or to the individual vials, such that the system 200 may correlate the unique identifiers of trays and the vials. For example, the system any inventory what each tray is holding. When the tray's RFID identifier is scanned, corresponding data may be propagated to the server 202 and associated with each vial. A user may register/validate the correlations by scanning individual vials as well. In another scenario, an asset may pass through an RFID gateway (or checkpoint) that triggers updating of a location of the asset. A segmental multimode wireless flexible product 228 attached to the asset may broadcast a location of the asset (e.g., using one or more of Bluetooth, LoRa, Wi-Fi, etc.). An RFID scanner in the gateway may update an associated database that is linked with the system 200 to indicate the location, using the RFID identifier, such that the system 200 may associate the updated location with the segmental multimode wireless flexible product 228. This allows notifications and/or communications (e.g., e-mail, SMS, etc.) to be triggered from the system 200 when the assets passes through the RFID gateway or checkpoint.

In one example of operation, the association database 238 may be queried with any one of the unique identifiers (e.g., read from the barcode of second asset tag 226), and a set of all unique identifiers (e.g., shows as set 242 corresponding to one row of table 240) corresponding to the same segment of the segmental multimode wireless flexible product 228 is returned from the database 238. Advantageously, any one of three types of scanner (e.g., RF scanner, RFID scanner, and barcode scanner) may use the server 202 and/or database 238 to collect and process data corresponding to the asset to track movement and handling of the asset by reading any one of the unique identifiers. For example, a transportation entity may only use RFID identifiers to track movement of assets being carried between depots, and a delivery entity may only use barcode identifiers when the asset is delivered. However, through association of all three types of identifier with the same asset, data associated with any one of the unique identifies may automatically be associated with all of the other unique identifiers. Thus, as long as any one of the unique identifiers of the segmental multimode wireless flexible product 228 is read and recorded at various locations, the data tracked and associated with others of the identifiers may be retrieved and presented. Advantageously, since the segmental multimode wireless flexible product 228 is capable of tracking its own locations, and of uploading that information to server 202, for example, the use of any one of the unique identifiers may allow access to that tracking information.

Hierarchical Graphs

Each segmental multimode wireless flexible product 228 (e.g., tape node) may be configured with different communication abilities. For example, one type of tape node has a communication hierarchy of long-range (cellular, satellite, etc.), medium-range (LoRa, etc.), and short-range (Bluetooth, etc.) communication capability. A tape node may also may have a master-slave (parent-child) hierarchy, where short-range. End nodes may be the master node in scheduling or determining communications, in some embodiments. These associations and hierarchy may be in a graph or stored in a database for the system 200. Associations and operations on the nodes are typically made by direct communication, but with the correlated identifiers, links may also be established using the associations in the database 238. Operations on the graph are the same, regardless of which unique identifier is used. Through the association, not all tags need communicate, since the association of the corresponding unique identifiers allows system 200 to know that the correlated tags should be treated with the same operations. For example, when updating the status/location of an asset associated with a barcode, that information is propagated to all of the correlated identifiers (e.g., RFID identifier used by the supplier, RFID identifier of the segmental multimode wireless flexible product 228, an identifier associated with a Bluetooth radio on the segmental multimode wireless flexible product 228, etc.).

Figure 5:
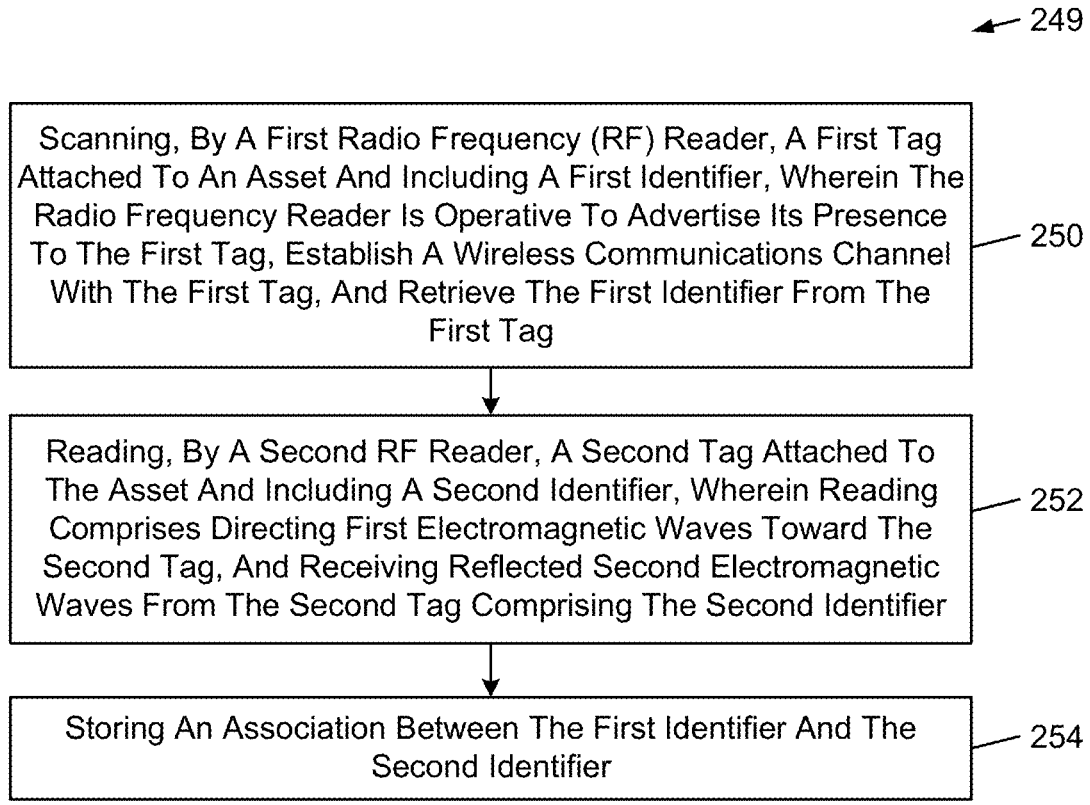
FIG. 5 is an example flow diagram of a process of reading, correlating, and storing asset identifiers, in embodiments.

FIG. 5 shows a flow diagram illustrating one example process 249 for associating identifiers retrieved from different sources. In accordance with this process, in block 250, a first radio frequency (RF) reader scans a first tag that is attached to an asset and includes a first identifier, where the radio frequency reader is operative to advertise its presence to the first tag, establish a wireless communications channel with the first tag, and retrieve the first identifier from the first tag. In one example of block 250, the first wireless module 214 of multimode wireless scanner 270 reads a first unique identifier from the wireless product tag 230 of the segmental multimode wireless flexible product 228.

In block 252, a second RF Reader reads a second tag that is attached to the asset and includes a second identifier, where the reading comprises directing first electromagnetic waves toward the second tag and receiving reflected second electromagnetic waves from the second tag comprising the second identifier. In one example of block 252, the second wireless module 216 of multimode wireless scanner 270 reads a second unique identifier from the first asset tag 224 of the segmental multimode wireless flexible product 228.

In block 254, an association between the first identifier and the second identifier is stored. In one example of block 254, association module 212 stores the first identifier and the second identifier in the table 240 of the association database 238.

Exemplary Computer Apparatus

Figure 6:
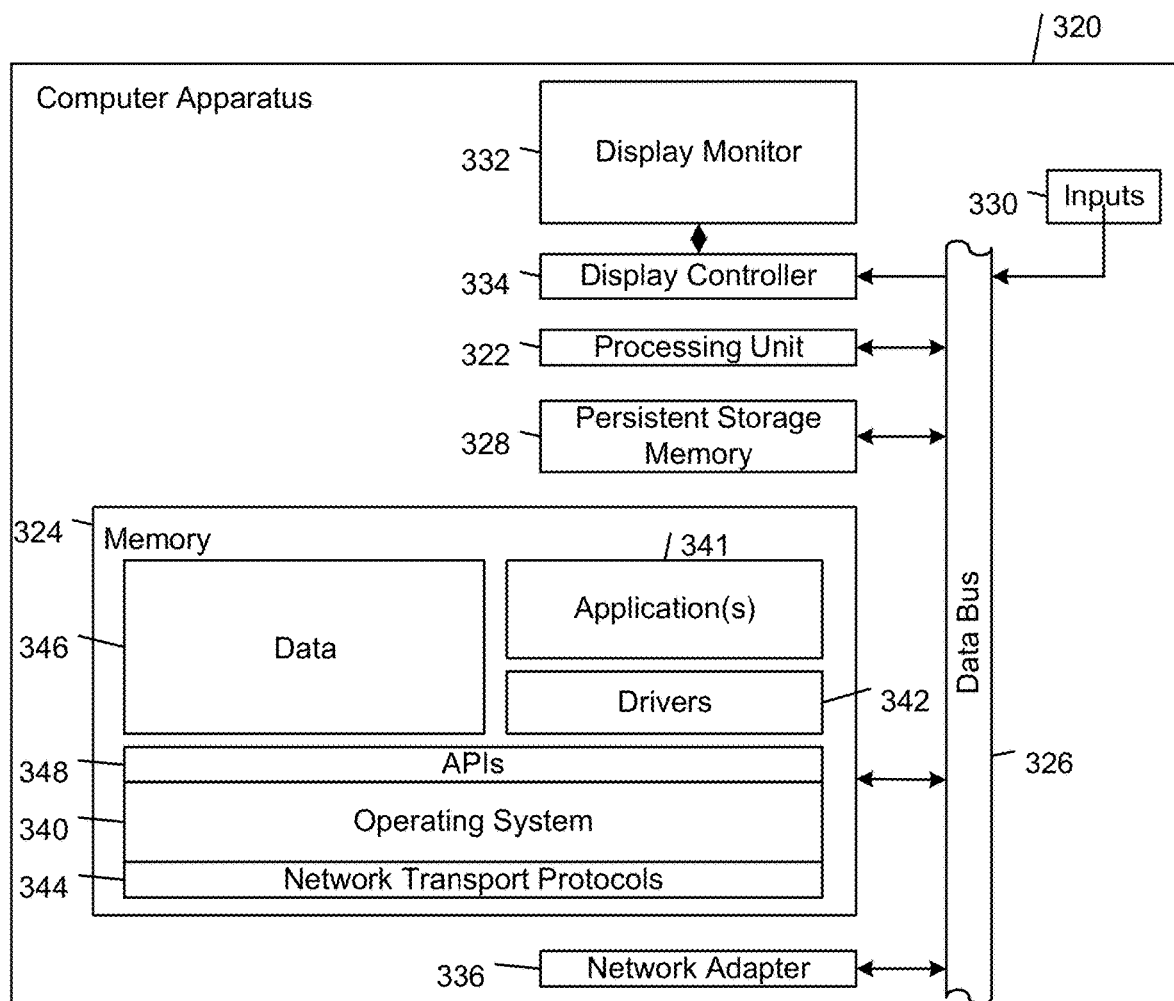
FIG. 6 is a block diagram of an example computer apparatus, in embodiments.

FIG. 6 shows an example embodiment of a computer apparatus 320 that represents one or more of the processing devices described above. The computer apparatus 320 includes a processing unit 322, a memory 324, and a data bus 326 that couples the processing unit 322 to the various components of the computer apparatus 320. The processing unit 322 may include one or more digital processors, each of which may be in the form of any one of various commercially available computer processors. The memory 324 may be implemented as one or more computer-readable media associated with a software application addressing space that defines the addresses that are available to software applications. The memory 324 may include a read only memory (ROM) that stores a basic input/output system (BIOS) that contains start-up routines for the computer apparatus 320, and a random-access memory (RAM). The data bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the data bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the memory 324, including application programming interfaces 348 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the hierarchical classification systems described herein, drivers 342 (e.g., a GUI driver), network transport protocols 344, and data 346 (e.g., input data, output data, program data, a registry, and configuration settings).

Network Communication

FIG. 7 shows an example network communications environment 400 (also referred to herein as an "IOT system" 400) that includes a network 402 that supports communications between one or more servers 404 (e.g., server 202 of FIG. 4B) executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface and the wireless communications unit 416 is implemented by a tape node that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface and the master tape node 424 is implemented by a tape node that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface and the master tape node 460 is implemented by a tape node that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Figure 8:
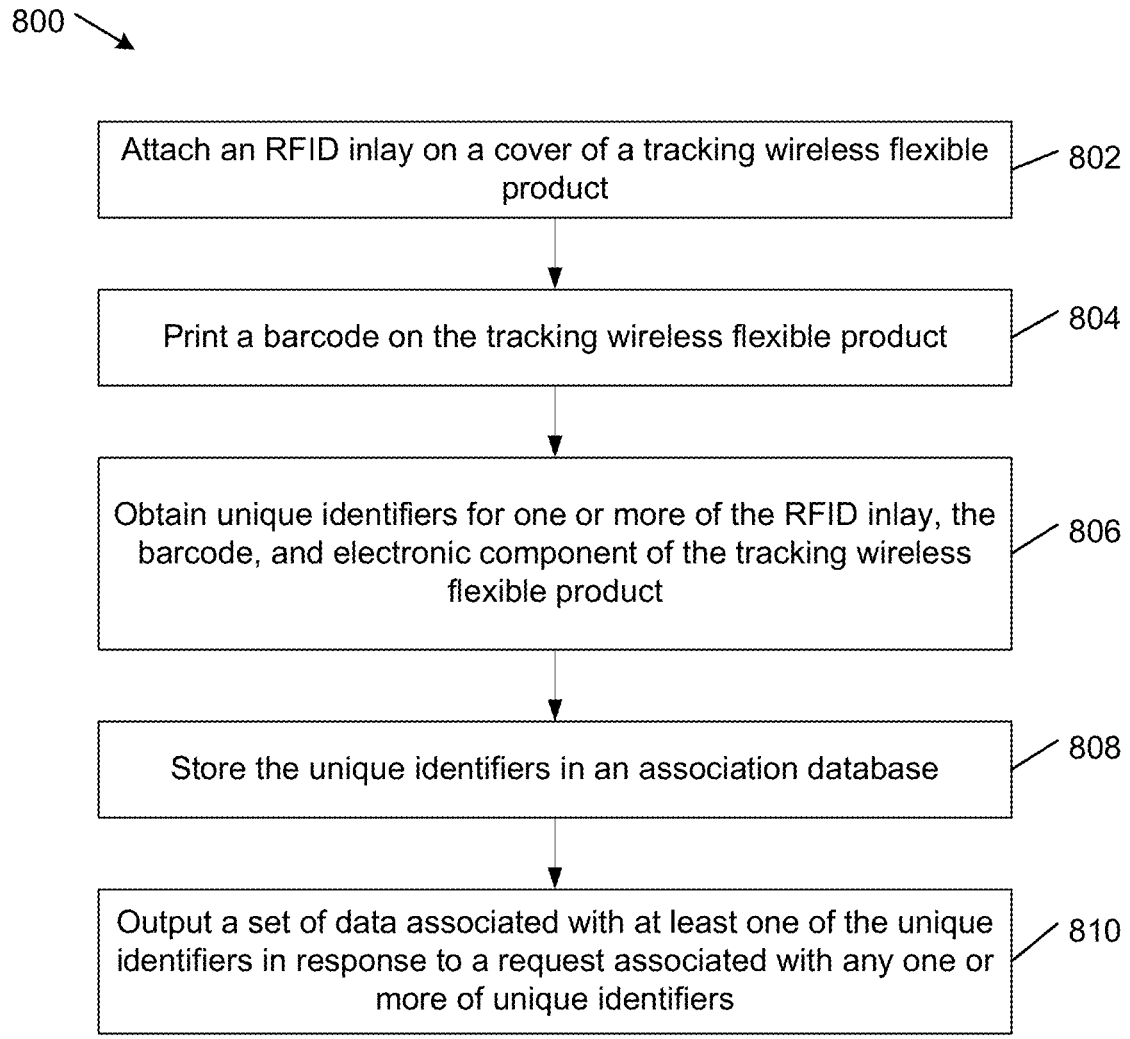
FIG. 8 is a flowchart illustrating one example method of fabricating a segmental multimode wireless flexible product having associated identifiers, in embodiments

FIG. 8 depicts a method 800 of fabricating a segmental multimode wireless flexible product having associated identifiers in embodiments. Method 800 is implemented using one or more of the system components discussed above with respect to FIGS. 1-7. Individual blocks within method 800 may be implemented via computer readable instructions that, when executed by one or more processors, control the executing processor to implement the functionality associated with the block.

In block 802, method 800 attaches an RFID inlay on a tracking wireless flexible product. In one example of block 802, the RFID inlay 16, or any other RFID inlay referenced herein, is attached to the tracking wireless flexible product 20. The RFID inlay 16 may be attached to a cover of the tracking wireless flexible product 20. Any aspects of any RFID inlay discussed above may be implemented in block 802 by method 800.

In block 804, if included, the method 800 prints a barcode on the tracking wireless flexible product. In one example of block 804, the printer controller 36, controlled the barcode printer module 14, prints the barcode 22 on the wireless flexible product 20. The barcode may be aligned with the RFID inlay, or may be located on any other portion of the tracking wireless flexible product. Any aspects of any barcode discussed above may be implemented in block 804 by method 800.

In block 806, unique identifiers for one or more of the RFID inlay, the barcode, and one or more electronic components of the tracking wireless flexible product are obtained. In one example of block 806, one or more of a first unique identifier (e.g., a tape ID) associated with the tracking wireless flexible product is obtained by the first wireless module 214, a second unique identifier (e.g., an RFID identifier) associated with the RFID inlay 16 is obtained by a second wireless module 216, and a third unique identifier associated with the barcode 22 is obtained by the third reader module 218. Block 806 may be implemented by one or more of a read action in which a scanner (such as scanner 270 discussed above) captures the associated identifiers from the tracking wireless flexible product, RFID inlay, and/or barcode. Moreover, block 806 may be implemented by one or more of a write action in which a scanner or other wireless module writes the associated identifiers from the tracking wireless flexible product, RFID inlay, and/or barcode. Moreover, individual ones of the unique identifiers may be obtained at different locations. For example, a supplier may obtain the first and second unique identifiers when the RFID inlay is attached to the tracking wireless flexible product, and a company may obtain the third identifier associated with the barcode when a printer operated by the company prints the barcode. Alternatively, each of the first, second, and third unique identifiers may be obtained at the same time, such as by the printer that is capable of reading/writing the unique identifier (or other data) to each of the tracking wireless flexible product, the RFID inlay, and the barcode.

In block 808, method 800 stores the unique identifiers in an association database. In one example of operation of block 808, the server 202 receives the first unique identifier, the second unique identifier, and the third unique identifier and stores them in association with one another, and with a given asset, in the association database 238.

In block 810, method 800 outputs a set of data associated with all of the unique identifiers in response to a request associated with any one or more of the unique identifiers. In one example of block 810, the server 202 receives a request identifying one (or more) of the unique identifiers stored in the association database 238 and responds by sending data associated with one or more of any of the unique identifiers associated with the requested unique identifier.

The systems and methods discussed herein allow for any one of three types of scanner (e.g., RF scanner, RFID scanner, and barcode scanner) to collect and process data corresponding to the asset to track movement and handling of the asset by reading any one of the unique identifiers. For example, a transportation entity may only use RFID identifiers to track movement of assets being carried between depots, and a delivery entity may only use barcode identifiers when the asset is delivered. However, through association of all three types of identifier with the same asset, data associated with any one of the unique identifies may automatically be associated with all of the other unique identifiers. Thus, as long as any one of the unique identifiers of the tracking wireless flexible product is read and recorded at various locations, the data tracked and associated with others of the identifiers can be retrieved and presented. Advantageously, since the tracking wireless flexible product is capable of tracking its own locations, and of uploading that information to server, for example, the use of any one of the unique identifiers may allow access to that tracking information.

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

What is claimed is:

1. A method comprising:
   receiving a first wireless communication comprising a first identifier from a first wireless tag attached to an asset, the first wireless communication performed using a first wireless communication protocol, wherein the first identifier is uniquely associated with the first wireless tag;
   receiving a second wireless communication comprising a second identifier different than the first identifier from a second wireless tag attached to the asset, the second wireless communication performed using a second communication protocol, wherein the second identifier is uniquely associated with the second wireless tag;
   associating the first identifier with the second identifier; and
   storing the association between the first identifier and the second identifier in a database.

2. The method of claim 1, further comprising:
   receiving a third identifier;
   associating the third identifier with the first identifier and the second identifier; and
   and storing the association between the third identifier and the first and second identifiers in the database.

3. The method of claim 2, wherein the third identifier is encoded in a barcode displayed on a tag attached to the asset.

4. The method of claim 1, wherein the database is hosted on a server.

5. The method of claim 1, wherein the database is stored on a memory of a wireless scanner.

6. The method of claim 1, wherein the first wireless communication protocol comprises a radio frequency identification (RFID) protocol.

7. The method of claim 1, wherein the second communication protocol comprises one or more of a Bluetooth-based communication protocol, a Bluetooth Low Energy (BLE) communication protocol, a Zigbee communication protocol, a Z-Wave communication protocol, a Long Range (LoRa) communication protocol, a LoRaWAN communication protocol, a near-field communication (NFC) protocol, a Wi-Fi communication protocol, and a cellular data communication protocol.

8. The method of claim 1, wherein the first wireless tag is programmed by a first entity, and the second wireless tag is programmed by a second entity different from the first entity.

9. The method of claim 1, further comprising:
   prior to associating the first identifier with the second identifier, determining that a temporal or spatial proximity condition is satisfied, wherein
   the associating the first identifier with the second identifier is responsive to the determining that the temporal or spatial proximity condition is satisfied.

10. The method of claim 9, wherein the determining that the temporal or spatial proximity condition is satisfied comprises determining that the first wireless tag and the second wireless tag both appear in a single image captured by a camera.

11. The method of claim 1, wherein the first wireless tag is associated with a supplier, and the second wireless tag is associated with an entity different from the supplier.

12. The method of claim 1, wherein the first wireless tag is an RFID tag.

13. The method of claim 12, further comprising:
    programming the first wireless tag to store the second identifier on a memory of the first wireless tag.

14. The method of claim 13, wherein the first wireless tag is configured to transmit an RFID signal comprising the second identifier in response to being scanned by an RFID reader.

15. A nontransitory computer readable storage medium including instructions that, when executed by a processor, cause the processor to:
    receive a first wireless communication comprising a first identifier from a first wireless tag attached to an asset, the first wireless communication performed using a first wireless communication protocol, wherein the first identifier is uniquely associated with the first wireless tag;
    receive a second wireless communication comprising a second identifier different than the first identifier from a second wireless tag attached to the asset, the second wireless communication performed using a second communication protocol, wherein the second identifier is uniquely associated with the second wireless tag;
    associate the first identifier with the second identifier; and
    store the association between the first identifier and the second identifier in a database.

16. The nontransitory computer readable storage medium of claim 15, wherein the first wireless communication protocol comprises a radio frequency identification (RFID) protocol.

17. The nontransitory computer readable storage medium of claim 15, the instructions, when executed by a processor, further cause the processor to:
    prior to associating the first identifier with the second identifier, determine that a temporal or spatial proximity condition is satisfied, wherein
    the associating the first identifier with the second identifier is responsive to the determining that the temporal or spatial proximity condition is satisfied.

18. The nontransitory computer readable storage medium of claim 17, wherein the determining that the temporal or spatial proximity condition is satisfied comprises determining that the first wireless tag and the second wireless tag both appear in a single image captured by a camera.

19. The system of claim 18, the instructions, when executed by the processor, cause the system to:
    prior to associating the first identifier with the second identifier, determining that a temporal or spatial proximity condition is satisfied, wherein
    the associating the first identifier with the second identifier is responsive to the determining that the temporal or spatial proximity condition is satisfied.

20. A system comprising
    a processor; and
    a memory storing instructions that, when executed by the processor, cause the system to:
    receive a first wireless communication comprising a first identifier from a first wireless tag attached to an asset, the first wireless communication performed using a first wireless communication protocol, wherein the first identifier is uniquely associated with the first wireless tag;
receive a second wireless communication comprising a second identifier different than the first identifier from a second wireless tag attached to the asset, the second wireless communication performed using a second communication protocol,
wherein the second identifier is uniquely associated with the second wireless tag;
associate the first identifier with the second identifier; and
store the association between the first identifier and the second identifier in a database.

\* \* \* \* \*